C. M. Williams.
Carburetor.
No. 2,785. Reissued Oct. 22, 1867.
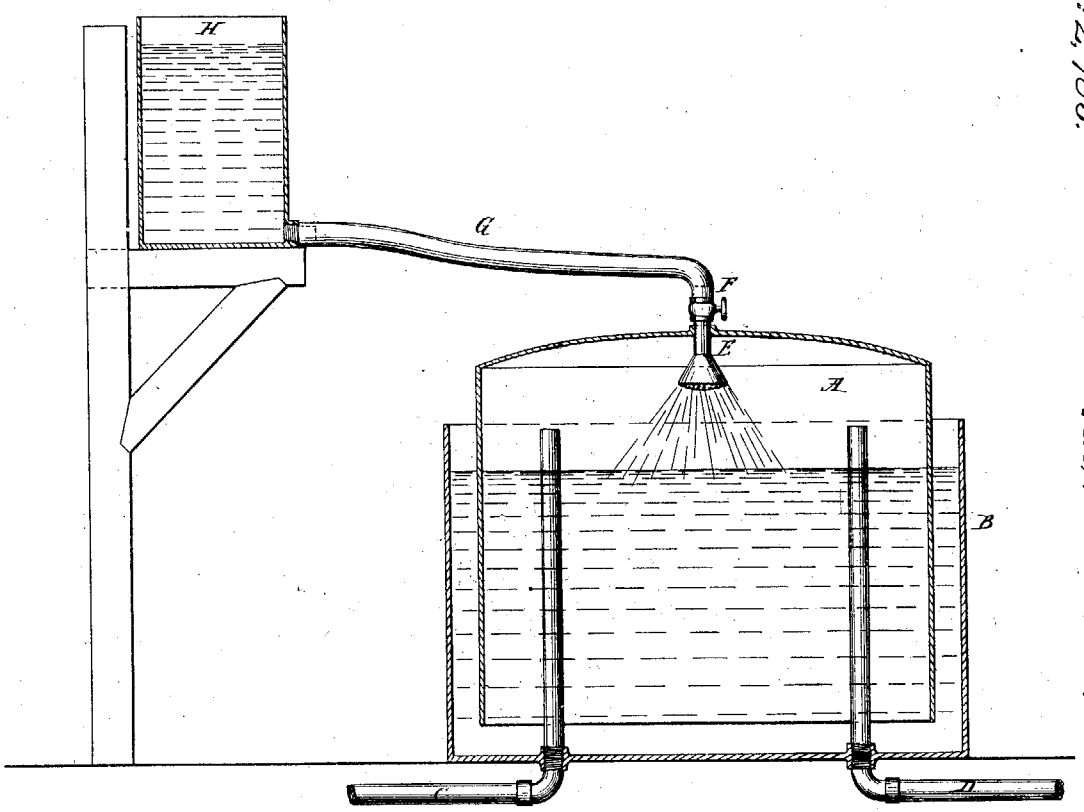
Witnesses
Jno. B. Beatty
G. Hodges.
Inventors.
C. M. Williams
N. PETERS, PHOTO-LITHOGRAPHER, WASHINGTON, D. C.

UNITED STATES PATENT OFFICE.

HENRI L. STUART, ASSIGNEE OF C. M. WILLIAMS, OF NEW YORK, N. Y.

IMPROVEMENT IN CARBURETING GASES.

Specification forming part of Letters Patent No. 61,033, dated January 8, 1867; Reissue No. 2,785, dated October 22, 1867.

*To all whom it may concern:*

Be it known that CYRUS M. WILLIAMS, of New York city, in the State of New York, invented a new and useful Improvement in Methods of Carbureting Gases; and I do hereby declare that the following is a full and exact description thereof, reference being had to the accompanying drawings, and to the letters of reference marked thereon and making a part of this specification.

A is a gas-holder. B is the tank, filled with water, in which the gas-holder is placed. C is the gas induction pipe; D, the outlet-pipe. H is a vessel in which is placed the hydrocarbon liquid. G is a flexible tube. F is a stop-cock, and E is a sprinkler inside the gas-holder A, by which the liquid is showered through the gas.

The object of this invention is to provide for the uniform carburization of gases (either common air or carbureted hydrogen) in large volumes before distribution to the service-mains; and it consists for this purpose in the application of the hydrocarbon liquids to the volume of gases in the holder by such devices as will thoroughly incorporate with the gas the vapor of a volatile hydrocarbon liquid, thus giving it a great photometric value. There are many forms of apparatus which may be used to accomplish this result, the most obvious and simple method being to introduce a quantity of hydrocarbon liquid upon the surface of the water in the tank inside the holder, where it will float on the surface of the water, and by its evaporation mix with the volume of gas in the holder, the hydrocarbon being added from time to time as required; but I prefer to use the device shown in the drawings, by which the hydrocarbon liquid is divided into fine particles and showered through the volume of gas, permeating it thoroughly, the remaining liquid falling through any fibrous substance, to prolong the division of the hydrocarbon fluid or not onto the surface of the water, and being evaporated, as in the first method.

The carbon spirit may be contained in a reservoir placed at a sufficient height above the holder to descend by its weight, being connected with the holder by a flexible tube or sliding pipes to compensate for the rise and fall of the holder, the motion of which may also be used to work any automatic device or apparatus necessary or desirable to regulate and supply the proper quantity and regular flow of the hydrocarbon liquid; or by means of a force-pump intermittent showers of spray may be injected, accomplishing the same result.

It may be found desirable to suspend in the holder some fibrous material for the purpose of increasing the evaporating-surfaces, and arranged so as to receive the dropping of the shower of hydrocarbon.

The temperature of the water in the tank of the holder may be regulated as desired by the waste furnace heat or steam, thus keeping the evaporation of the hydrocarbon under control.

I have described the means of carbureting the gas in the holder, but in places where carbureted-hydrogen or coal gas is generated. It is obvious that there are other places where by similar means the hydrocarbon may be evaporated. I do not therefore limit myself to the precise devices herein shown and described; but What I do claim as my invention, and desire to secure by Letters Patent, is—

1. Carbureting gases by mixing or combining with them the vapors of a volatile hydrocarbon liquid before it is introduced into the service-mains for distribution, substantially as described.

2. The devices and means herein shown and described for carbureting gases in the holder before its distribution to the service-mains.

HENRI L. STUART.

Witnesses:
J. A. BASSETT,
C. M. NEWTON.